March 22, 1955  O. E. E. STROMBERG  2,704,585
HYDRAULIC TRAILER BRAKE ASSEMBLY
Filed Sept. 14, 1950  3 Sheets-Sheet 1
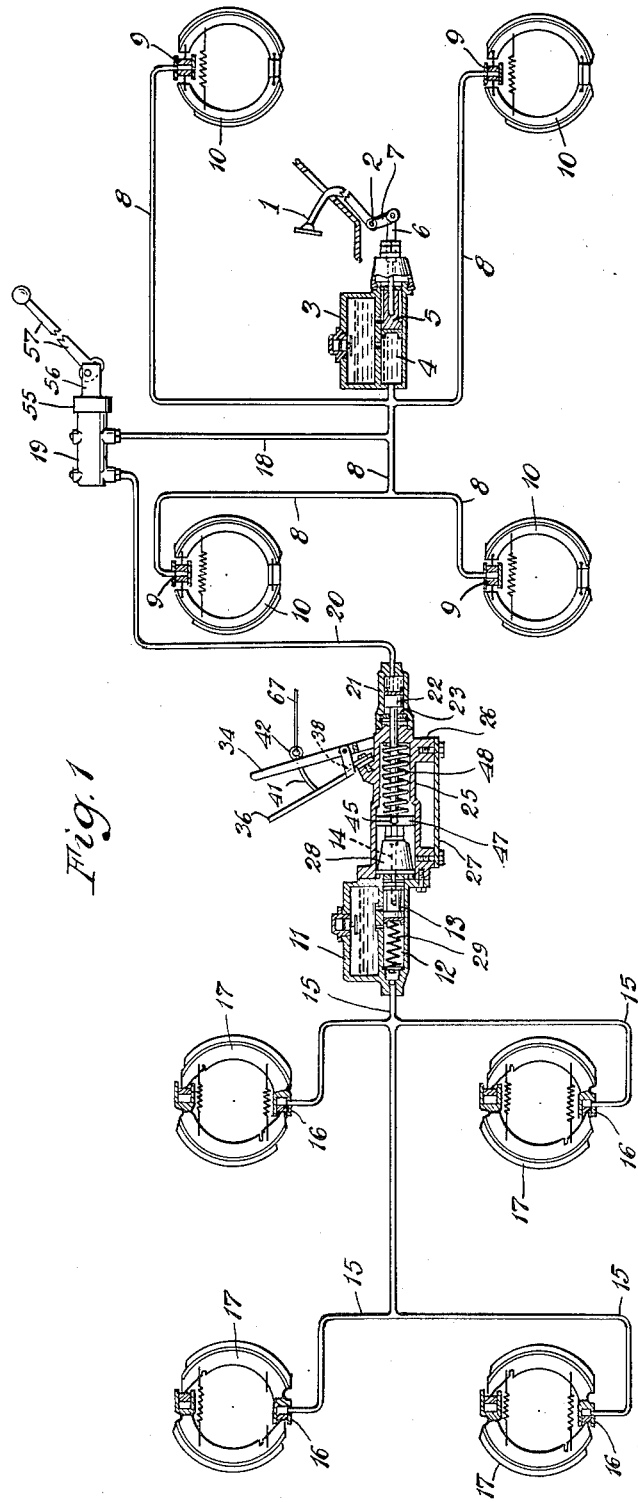
Inventor
Olof E. E. Stromberg
by Parker + Carter
Attorneys March 22, 1955  O. E. E. STROMBERG  2,704,585
HYDRAULIC TRAILER BRAKE ASSEMBLY
Filed Sept. 14, 1950  3 Sheets-Sheet 2
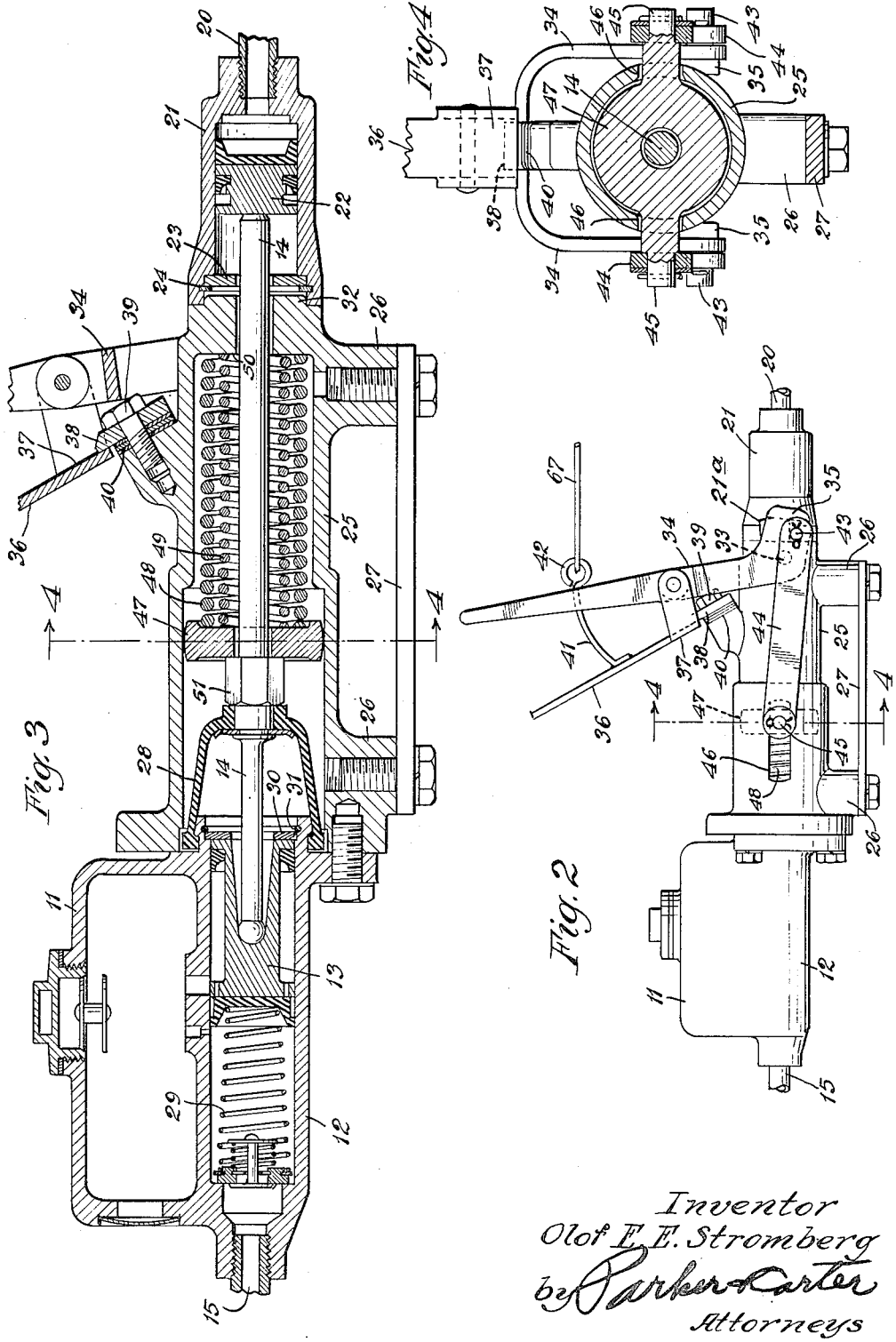
Inventor
Olof E. E. Stromberg
by Parker Carter
Attorneys March 22, 1955  O. E. E. STROMBERG  2,704,585
HYDRAULIC TRAILER BRAKE ASSEMBLY
Filed Sept. 14, 1950  3 Sheets-Sheet 3
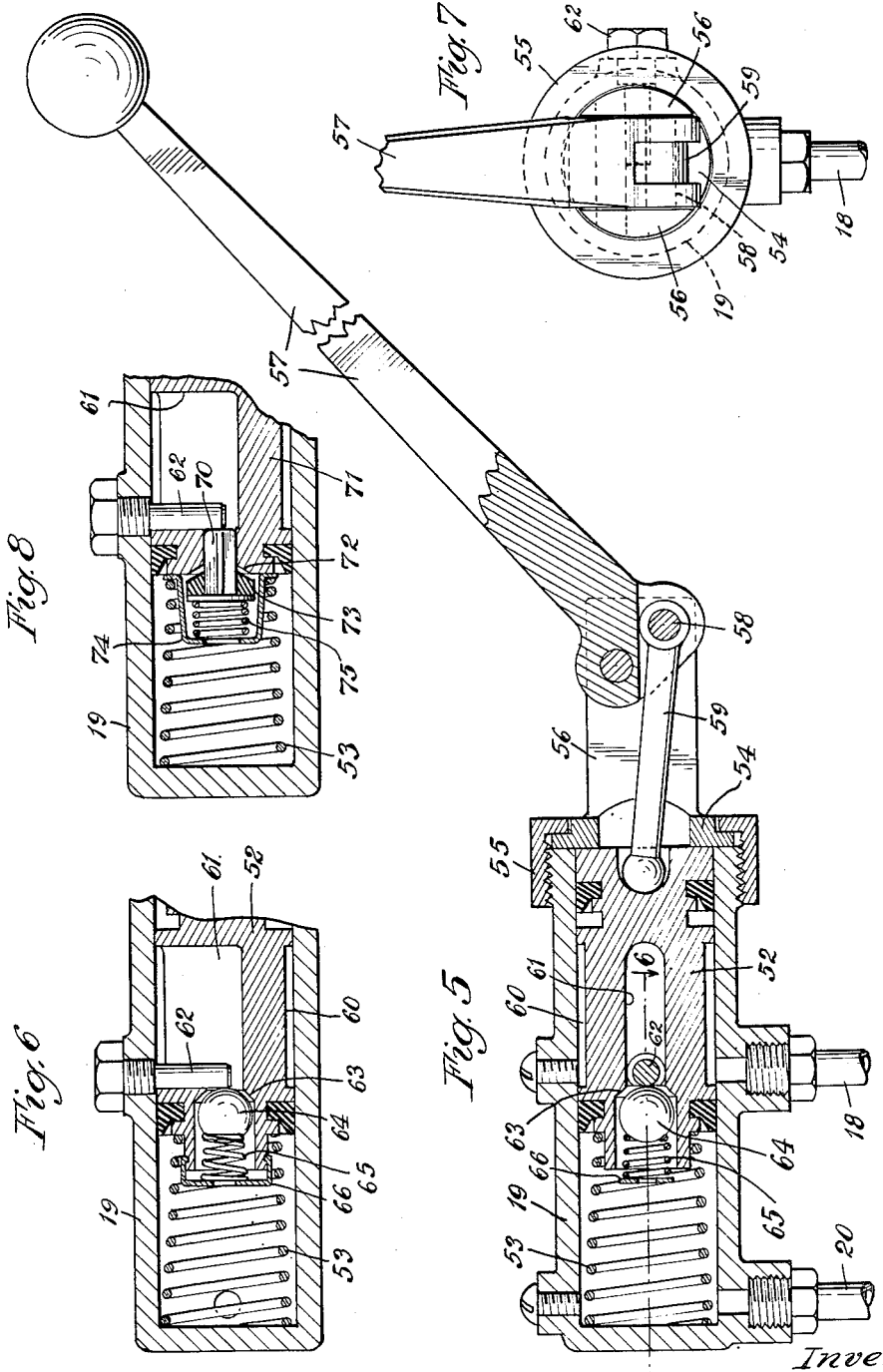
Inventor
Olof E. E. Stromberg
by Parker & Carter
Attorneys

UNITED STATES PATENT OFFICE 2,704,585
Patented Mar. 22, 1955

2,704,585

HYDRAULIC TRAILER BRAKE ASSEMBLY

Olof E. E. Stromberg, Chicago, Ill.

Application September 14, 1950, Serial No. 184,767

9 Claims. (Cl. 188—3)

My invention relates to improvements in hydraulic brake systems for automobile tractor trailer trains and the like and has for one object to provide means whereby in a hydraulic system, normally adapted to apply the brakes to tractor and trailer simultaneously, the braking power may be applied at the will of the operator to the trailer only.

Another object of the invention is to provide in combination with a tractor, trailer, automobile hydraulic brake system, whereby brakes may be applied to the trailer alone, means to prevent brake application on the tractor more effective than the brake application on the trailer.

Other objects will appear from time to time throughout the specification and claims.

I provide in combination with a hydraulic brake system for an automobile or tractor, a hydraulic brake system for the trailer, and a connection between the two systems whereby application of the brakes on the tractor will simultaneously apply the brakes on the trailer. I associate with this system a control, perhaps manual, whereby the driver on the tractor may apply the brakes to the trailer alone.

If the driver subsequently applies the brakes to the tractor in the usual manner, this will not affect the trailer brakes until the pressure in the hydraulic system on the tractor equals the pressure in the hydraulic connection with the trailer, after which both systems will operate as a unit and any increase in the tractor system will be immediately effective on the trailer, thus preventing the application of greater braking force to the tractor than can be applied to the trailer.

I also propose to associate with this device a releasable connection such that if the coupling between the tractor and the trailer should break, the hydraulic connection between them will be automatically broken and the pressure at that time in either or both the hydraulic braking systems will be retained automatically without substantial pressure loss.

My invention is illustrated more or less diagrammatically in the accompanying drawings, wherein:

Fig. 1 is a diagrammatic flow sheet illustrating my invention;

Fig. 2 is a side elevation of the hydraulic coupling between the tractor and the trailer;

Fig. 3 is a vertical longitudinal section through the coupling;

Fig. 4 is a section along the line 4—4 of Figs. 2 and 3;

Fig. 5 is a vertical longitudinal section through the manual control member;

Fig. 6 is a horizontal longitudinal section along the line 6—6 of Fig. 5;

Fig. 7 is an end elevation of the device shown in Fig. 5; and

Fig. 8 is a section similar to Fig. 6, showing a modified form of valve.

Like parts are indicated by like characters throughout the specification and drawings.

Referring first to the flow sheet, 1 is a brake pedal pivoted at 2 on the tractor. 3 is a reservoir for hydraulic brake fluid. 4 is a master cylinder supplied with hydraulic fluid from the reservoir 3. 5 is the master plunger in the cylinder 4 adapted to be actuated by the rod 6, which in turn is actuated by the short end 7 of the brake lever or pedal 1. 8 is a fluid duct leading through various branches to brake cylinders 9 associated with brake shoes 10, one for each of the tractor wheels. 11 is a storage reservoir and 12 a master cylinder on the trailer. The master cylinder contains a master plunger 13 actuated by a plunger rod 14. Hydraulic fluid is forced by the master plunger 13 through the branches of the duct 15 to brake cylinders 16 associated with brake shoes 17, one for each of the trailer wheels.

Leading from the duct 8, preferably adjacent the master cylinder 4, is a duct 18 which extends to the manual control cylinder 19. 20 is a duct leading from the cylinder 19 to the coupling cylinder 21. In the coupling cylinder 21 is a floating piston 22, the outward excursion of which is limited by a perforate stop plate 23 held in the open end of the cylinder by a lock ring 24. When pressure is applied to the tractor brake system by depressing the pedal 1, the brakes 10 will be actuated and at the same time pressure will be applied through duct 18, cylinder 19 and duct 20 to the piston 22 tending to move it toward the stop 23.

25 is a housing extending forwardly from the cylinder 12 having lugs 26 which may be bolted to a mounting plate 27 on the tractor. The plunger rod 14 extends from the plunger 13 beyond the end of the housing 25. 28 is a flexible sealing bell enclosing the outer end of the cylinder 12 to prevent entrance of dust and dirt into the cylinder 12, the plunger 13 being provided with a spring 29 tending to move it toward the apertured stop washer 30 in the open end of the cylinder 12, the washer being held in position by the lock ring 31. The rod 14 where it projects from the end of the housing 25 extends through the washer 23 to engage the plunger 22 so that movement of the plunger 22 under the influence of hydraulic pressure applied in the tractor brake system causes movement of the plunger 13 to apply pressure to the brakes 17 of the trailer.

The housing 25 terminates at the end furthest from the master cylinder 12 in a boss 32 adapted to penetrate the open end of the cylinder 21, the housing being shouldered to abut the end of the cylinder, the boss holding the two in alignment.

Pivoted on the housing 25 at 33 is a bifurcated lock lever 34, which straddles the housing 25, carries a lock member 35 adapted to engage locking lugs 21a on the cylinder 21 so that when in the position shown in Figure 2 the cylinder 21 and the housing 25 are locked together in axial alignment. 36 is a latch lever, 37 a latch plate adapted to engage a fixed latch block 38 held on the housing 25 by a cap screw 39, adjusting shims 40 being provided. 41 is a release pin anchored at one end on the lever 36 extending through the lever 34 and terminating in a ring 42.

The bifurcated ends of the lever 34 also have pivoted thereon at 43, links 44. These links extend rearwardly along the housing 25 to pins 45 traveling in slots 46. These pins extend outwardly from the cross head 47 slidable on the piston or plunger rod 14. Springs 48, and 49 within the housing 25 abut at one end on the cross head 47 and at the other end on the centrally apertured closed end of the housing 25 at 50.

In the position shown in Figures 2 and 3, these springs are compressed by the lever 34 and the nut 51 on the piston rod 14 is held against the cross head 47 by the pressure of the same spring 29.

With the parts in the position shown in Figure 5, there is a free connection from the hydraulic system on the tractor through the ducts 18, cylinder 19 and duct 20 to the cylinder 21. If the driver applies pressure to the piston 5, hydraulic fluid will be forced into the brake cylinders 9 on the tractor. Hydraulic fluid also will be forced into the cylinder 21 and the piston 22 will be pushed to the left causing the piston 13 to move to the left, the nut 51 leaving the cross head 47. This will cause the master cylinder on the trailer to apply the trailer brakes. Thus brakes on the trailer and on the tractor will be simultaneously applied. Relative sizes of piston and brake elements will, of course, be adjusted so as to produce equal braking effect on tractor and trailer.

Referring now to Figures 5, 6 and 7, the cylinder 19 may be mounted on the tractor in any desired position, on the dash, on the floor, or on the steering column, as the case may be. The cylinder 19 contains a piston 52, free to reciprocate in the cylinder 19, being normally forced by the spring 53 to the right against the stop ring 54 held in position by the apertured threaded cap 55.

Extending rearwardly from the end of the cylinder is a bracket 56 on which is pivoted a hand lever 57 having an offset pivot 58 which carries a pin 59 penetrating the stop ring 54 and engaging the piston 52. Movement of the lever 51 in a clockwise direction moves the piston 52 to the left. The piston 52 is reduced to provide a substantial clearance space between its ends at 60. This space communicates with the pipe 18. 61 is a slot longitudinally disposed in the piston 52 and communicating with the clearance space 60. 62 is a fixed pin penetrating the slot. The piston 52 has a centrally disposed valve seat 63 on which may seat the ball valve 64 forced toward its seat by the spring 65 in the stirrup 66. With the parts in the position shown in Figure 5, with the piston in its extreme right hand position, the pin 62 holds the ball 64 off its seat so that there is no obstruction to flow of hydraulic fluid from pipe 18 through clearance 60, slot 61, valve seat 63, the inner side of the cylinder around the spring 53 and out through the pipe 20. Thus when the parts are in the position shown in Figure 5, pressure applied to the hydraulic system on the tractor is effective through the cylinder 21 and piston 22 to apply brake pressure on the trailer.

When the operator wishes to apply the brakes on the trailer only, he rotates the hand lever 57 in a clockwise direction. This moves the piston 52 to the left, brings the valve seat 63 against the ball valve 64 and moves the ball valve 64 away from the pin 62, thus closing the hydraulic connection between pipes 18 and 20. Further movement of the lever 57 causes the piston 52 to exert a pressure through duct 20 on the piston 22 in the cylinder 21, thus applying the brakes on the trailer without any effect on the tractor brakes. As long as the operator holds the hand lever in the trailer brake applying position, the brakes remain applied on the trailer. As soon as he lets go of the lever, the spring 53 moves the piston to the left until the ball 64 is brought back into engagement with the pin 62 and the hydraulic connection between the tractor braking system and the cylinder 21 is reestablished.

If, on the other hand, the operator holds the lever in the trailer applying brake position, he may then apply the brakes on the tractor and the tractor brakes alone will respond to his foot pressure on the pedal until the pressure in the hydraulic system on the tractor exceeds the pressure in the cylinder 21. As soon as the foot applied hydraulic pressure exceeds the pressure applied by hand in cylinder 21, the valve 64 will be unseated against the light spring 65 and the pressure in the trailer side of the system will thereafter be the same as the pressure in the tractor side of the system. Thus it is impossible for the operator to apply more braking pressure to the tractor than he does to the trailer.

Thus the tractor and trailer hydraulic systems are totally separate. They are connected by a mechanical element, the piston rod 14, which is interposed between the master piston or plunger of the trailer brake system and piston and cylinder 21, 22 in hydraulic connection with the tractor brake system. The locking lever and latch shown in Figure 2 holds the cylinder 21 and the housing 25 in working relationship and under these circumstances the springs 48, 49 are compressed toward the right in Figure 3 so that the master plunger 13 on the trailer responds without interference to the pressure applied to it as a result of change in the pressure in the tractor hydraulic brake system. This situation continues just as long as the cylinder 21 is locked into engagement with the housing 25.

If it is desired to disconnect the tractor and trailer, the latch 36 is rotated in a clockwise direction. This permits the lever 34 to move in a clockwise direction to release the cylinder 21. At the same time this relieves the pressure on the springs 48, 49 and applies pressure to the master plunger on the trailer, thus applying the brakes on the trailer. The withdrawal of the piston rod 14 from the end of the cylinder 21 permits the piston 22 to move to the left to engage the stop 23, thus slightly increasing the volumetric capacity of the hydraulic system on the tractor. This will result in requiring slightly further depression of the foot pedal to cause brake application on the tractor but will otherwise not affect tractor brake application.

If it is desired to release the brakes on the trailer after the tractor and trailer have been disconnected the lever 34 will be rotated in a counterclockwise direction, again compressing the springs 48, 49 and permitting the spring 29 to move the plunger 13 to the right to release brakes on the trailer.

As a safety feature, a cable 67 will be attached to the tractor and to the eye 42 of shorter length than the flexible pipe joining the tractor system and the cylinder 21 so that if for any reason the coupling between tractor and trailer should be broken, this cable will release the latch 36 to permit the springs 48, 49 to rotate the lever 34 in a clockwise direction, will disengage the lock which holds the cylinder 21 in alignment with the housing 25 before tension is brought on the flexible cable. Thus the tractor brake system will be disconnected automatically from the trailer brake system, the trailer brakes will be automatically applied and the driver will still be able to operate the brakes on the tractor.

In the modified form of valve shown in Fig. 8, 70 is a valve stem slidable in the plunger 71. The plunger 71 carries a valve seat 72 against which seats a valve head 73 on the stem 70. 74 is a stirrup attached to the end of the plunger 71 and contains a spring 75 to seat the valve head 73. The stem 70 engages the pin 62 to unseat the valve when the plunger 71 is in the retracted position, just as was the case with respect to that shown in Figs. 5 and 6.

I claim:

1. In combination, a tractor and a trailer, separate hydraulic braking systems on each, a normally generally direct hydraulic connection between the two systems whereby brake applying pressure in the tractor system simultaneously generates brake applying pressure in the trailer system, means operatively associated with the hydraulic connection for generating brake applying pressure within said hydraulic connection effective on the trailer system independent of the pressure in the tractor system, said last mentioned means including a valve mechanism in the connecting means between the two systems, said valve mechanism being subject on one side to the hydraulic pressure in the tractor braking system and being subject on the opposite side to the hydraulic pressure which is effective to actuate the brakes on the trailer, whereby said valve mechanism connects the two systems for simultaneous braking action when a braking force applied to the tractor exceeds a predetermined point substantially equal to the braking force applied to the trailer.

2. In combination, a tractor and a trailer, brakes on each, two operator controlled brake applying means on the tractor, a hydraulic power transmission means extending from one of the brake applying means to the brakes on both the tractor and the trailer, for simultaneous application of said brakes, the second brake applying means being so associated with the hydraulic power transmission means as to apply pressure to the trailer brakes when actuated, a normally open by-pass associated with the second brake applying means, means for automatically closing the by-pass when the second brake applying means is actuated to supply braking pressure to the trailer brakes, means for maintaining the by-pass open when the second brake applying means is in normal position, said bypass closing means, after actuation of said second brake applying means, opening the by-pass responsive to the generation of pressure within said hydraulic transmission means by actuation of the first brake applying means that is greater than the pressure generated therein by actuation of the second brake applying means for simultaneous application of all the brakes at increased pressure.

3. In combination, a tractor and a trailer, brakes on each, two operator controlled brake applying means on the tractor, a hydraulic power transmission means extending from one of the brake applying means to the brakes on both the tractor and the trailer, for simultaneous application of said brakes, the second brake applying means being so associated with the hydraulic power transmission means as to apply pressure in that part only of the power transmission means which affects the trailer brakes, a normally open by-pass associated with the second brake applying means, means for automatically closing the by-pass responsive to the application of brake applying pressure by the second brake applying means to the trailer brakes, said closing means being adapted to prevent transmission of pressure from the second brake actuating means to the tractor brakes while permitting pressure applied by the first brake applying means to the entire transmission system to increase the pressure applied to the trailer brakes above that applied by the second brake applying means.

4. In combination, a tractor and a trailer, separate hydraulic braking systems on each, a severable hydraulic connection in series between the two systems whereby brake applying pressure in the tractor system simultaneously generates brake applying pressure in the trailer system, means associated with said hydraulic connection for generating brake applying pressure in the trailer system independent of the pressure in the tractor system, said hydraulic connection including a cylinder, a piston floating therein and a power cylinder, a piston reciprocable therein, said associated means including means for displacing the power piston to exert a pressure in the hydraulic connection to displace the floating piston, a valve in said power piston and other means for normally unseating said valve to permit free flow of hydraulic fluid through said connection to cause said simultaneous generation of brake applying pressure.

5. In combination, a tractor and a trailer, separate hydraulic braking systems on each, a severable hydraulic connection between the two systems including a cylinder, a piston floating therein, a power cylinder, a piston reciprocable therein, whereby brake applying pressure in the tractor system simultaneously generates brake applying pressure in the trailer system, means associated with said hydraulic connection for generating brake applying pressure in the trailer system independent of the pressure in the tractor system, including means for displacing the power piston to exert a pressure in the hydraulic connection to displace the floating piston, a valve in the power piston, means for normally unseating it to permit free flow of hydraulic fluid through the connection to cause said simultaneous generation of brake applying pressure and means operative when the power piston has been displaced for seating the valve to prevent escape of pressure to the tractor side of the brake system and to permit said independent generation of brake applying pressure to the trailer system.

6. In combination, a tractor and a trailer, separate hydraulic braking systems on each, a hydraulic connection between the two systems whereby brake applying pressure in the tractor system simultaneously generates brake applying pressure in the trailer system, means associated with the hydraulic connection for generating brake applying pressure in the trailer system independent of the pressure in the tractor system, said hydraulic connection including a cylinder, a piston floating therein, a power cylinder, a piston reciprocable therein, said associated means including means for displacing the power piston to exert a pressure in the hydraulic connection to displace the floating piston, a valve in the power piston, valve unseating means for normally unseating the valve to permit free flow of hydraulic fluid through the connection, other means operative when the power piston has been displaced for seating the valve to prevent escape of pressure to the tractor side of the brake system, the valve seating means being adapted to permit the valve to unseat when the pressure on the tractor side of the brake system exceeds the pressure on the trailer side of the hydraulic connection.

7. In combination, a tractor and a trailer, separate hydraulic braking systems for each, a hydraulic connection in series between the two systems whereby brake applying pressure in the tractor system simultaneously applies brake applying pressure in the trailer system, a cylinder in series with such connection, a piston in the cylinder constantly exposed on one side to the pressure in the tractor system and on the other to the pressure which is effective to actuate the brakes in the trailer system, a passage through the piston, a valve in said passage, means for holding the valve open when the piston is at one end of its excursion, means for moving the piston away from such end of its excursion and means for simultaneously closing the valve, the valve being free to open thereafter when the pressure on the tractor side of the system exceeds the pressure on the trailer side of the system.

8. In combination, a hydraulic tractor brake system, a hydraulic trailer brake system, a master plunger associated with the tractor brake system and a foot pedal adapted to actuate the plunger to increase the pressure in the tractor system, a master plunger associated with the trailer system adapted on movement thereof to increase the pressure in the trailer system, a connection between the tractor system and the master plunger on the trailer system including a floating piston, a mechanical connection between it and the trailer system master plunger and a hydraulic connection between the tractor system and the piston whereby increase in pressure in the tractor system displaces the floating piston and the trailer master plunger to increase the pressure in the trailer system in consonance with pressure increase in the tractor system, means in the connection between the two systems for manual increase in pressure in the connection and in the trailer system independent of the pressure in the tractor system, a valve in the connection adapted to unseat upon the increase of pressure in the tractor system above the increased pressure in the trailer system whereby thereafter a simultaneous pressure increase in both systems may take place.

9. In combination, a tractor and a trailer, separate braking systems on each, a hydraulic connection in series between the two systems whereby application of the brakes on the tractor causes simultaneous application of the brakes on the trailer, and means associated with said hydraulic connection for causing application of the trailer brakes independent of application of the tractor brakes, said means including a check valve held seated as a result of said independent pressure, and free to unseat, to permit simultaneous application of the tractor and trailer brakes upon creation of pressure in the tractor brake system greater than said independent pressure.

References Cited in the file of this patent

UNITED STATES PATENTS

| Number | Name | Date |
|---|---|---|
| 1,986,799 | Dickey | Jan. 8, 1935 |
| 2,160,747 | Mayer et al. | May 30, 1939 |
| 2,183,371 | Stromberg | Dec. 12, 1939 |
| 2,275,255 | Freeman | Mar. 3, 1942 |
| 2,307,644 | Schlumbrecht et al. | Jan. 5, 1943 |
| 2,362,324 | Stromberg | Nov. 7, 1944 |
| 2,366,608 | Freeman | Jan. 2, 1945 |